Aug. 25, 1925.

J. E. SHAFER

ANTIFRICTION BEARING

Filed Sept. 30. 1918

1,551,334

Inventor:
Julius E. Shafer

Atty.

Patented Aug. 25, 1925.

1,551,334

UNITED STATES PATENT OFFICE.

JULIUS E. SHAFER, OF CHICAGO, ILLINOIS.

ANTIFRICTION BEARING.

Application filed September 30, 1918. Serial No. 256,207.

*To all whom it may concern:*

Be it known that I, JULIUS E. SHAFER, a citizen of the United States, and a resident of Chicago, in the county of Cook and State of Illinois, have invented certain new and useful Improvements in Antifriction Bearings, of which the following is a full, clear, and exact description, reference being had to the accompanying drawing, forming a part of this specification.

My invention relates more particularly to that class of anti-friction bearings employing rollers and wherein provision is made whereby the bearing becomes self-aligning, the bearing being adapted to receive either thrust or radial loads or both.

One object of my invention is to so construct the race-ways that should the bearing mounting be not perfectly aligned the bearing will operate successfully.

Another object of my invention is the provision of a separator or holder for the rolling elements which will maintain these elements in proper relation one with another while in position in the bearing, and permit the removal of the rolling elements and separator as a unit for the purpose of cleaning or inspection.

Other objects of my invention will appear and be described thruout the specification.

The novelty of my invention will be hereinafter more specifically pointed out and fully set forth in the claims.

In the drawing.

The same numerals of reference will be used to indicate identical parts in all the figures.

Referring to Figs. 1, 2, and 3, 5 represents the inner race of the bearing with its outer roller contact surface ground as a section of the sphere.

The outer race 6 is formed with its inner surface convexed in such a manner that an axial section presents the same radius as a similar section of the inner race.

Figure 1:
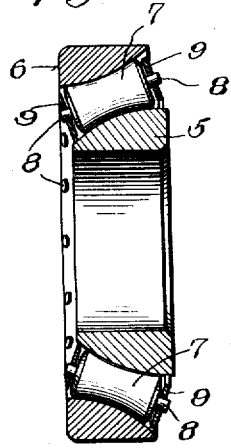
Fig. 1 is a sectional side elevation of one form of bearing embodying my invention.

The rollers 7 are formed with a bearing surface which conforms to the curvature of both inner and outer races, the rollers 7 being of smaller diameter at the center of their length and larger at the ends, and in that form of bearing shown in Fig. 1 the rollers are provided with trunnions 8 which pass thru suitable openings in the side rings 9 of the separator.

Figure 2:
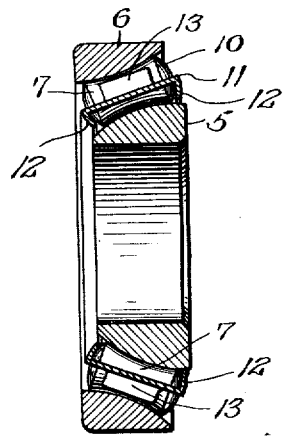
Fig. 2 is a corresponding view of another form of bearing embodying my invention.
Figure 3:
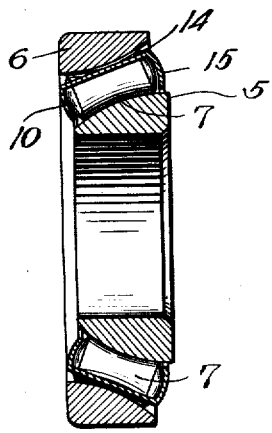
Fig. 3 is a corresponding view of still another form of bearing, the principal difference between the construction being the separator as shown in Figs. 2 and 3.

In that form of construction shown in Figs. 2 and 3 the rollers have their ends spherically rounded as at 10 while the separator 11, Fig. 2 is preferably formed of sheet metal with inwardly projecting side flanges 12 and outwardly projecting extensions 13, the extensions 13 being struck outwardly from the perforations within which the rollers are mounted and formed to nearly touch the surface of the rollers so as to afford a comparatively large bearing surface between the rollers and the separator.

The separator shown in Fig. 3 is somewhat similar to that shown in Fig. 2 without the projections 13 and comprises the tapered portion 14 which is perforated to permit a portion of the rollers to project thru it at the proper intervals, the inwardly projecting side flanges 15 being curved to approximately fit the spherical ends 10 of the rollers 7, the rollers being partly maintained against outward movement by the curvature of the flanges 15 and also by the shape of the perforations thru the tapered portion 14. The rollers are maintained against inward movement with relation to the separator by the curved flanges 15.

The rollers are inserted in the separator in the construction shown in Figs. 2 and 3 by being pressed into place, it being noted that the inner edges of the inturned flanges are closer together than the extreme length of the rollers with the result that when the rollers are pressed into place the edges of the inturned flanges of the separator are slightly sprung apart to permit the passage of the roller whereupon these edges resume their former position and retain the rollers in place against accidental removal.

It is to be noted that in that form of bearing shown in Figs. 1, 2 and 3 the rollers and separator maintain a constant position with relation to the outer race, any misaligning occurring in the operation of the bearing being entirely accommodated by the inner race.

It is to be observed that a bearing constructed as above set forth, with reference to the construction shown, is capable of withstanding radial loads as well as thrust loads in one direction, and in those cases where it is necessary to provide against thrust loads in opposite directions two bearings may be mounted and provided with means for adjustment whereby each bearing takes thrust load in one direction and both bearings support the radial load.

It is further to be noted that bearings constructed as above outlined in addition to being self-aligning, are capable of adjustment when worn and further that these bearings may be readily dis-assembled for inspection or cleaning, and that should either the inner or outer race-way be damaged in service a new race-way may be used in connection with the other parts of the bearing or a new set of rollers may be introduced without making it necessary to either re-grind the race-ways or incur any other expense or delay than that of simply supplying and mounting the required new parts.

Having thus fully described my invention, I claim:

1. In a bearing the combination of an inner spherical surfaced race ring having its maximum diameter adjacent one face thereof, an outer race ring having an inner surface curved as a complement of the curvature of the outer surface of the inner ring, and rolling elements between said rings and having their surfaces curved to conform to the surfaces of the rings the rollers having their axes angularly arranged with relation to the axis of the bearing.

2. In a bearing the combination of an inner spherical surfaced race ring having its maximum diameter adjacent one face thereof, an outer race ring having an inner surface curved as a complement of the curvature of the outer surface of the inner ring, rolling elements between said rings and having their surfaces curved to conform to the surfaces of the rings the rollers having their axes angularly arranged with relation to the axis of the bearing, and a cage for the rollers.

3. In a bearing the combination of an inner spherical surfaced race ring having its maximum diameter adjacent one side thereof so that the center of the bearing surface is at an angle to the axis of the bearing, an outer race ring having an inner surface curved as a complement to the curvature of the surface of the inner ring and having the center of its bearing surface at an angle to the axis of the bearing, and concaved surface rollers mounted between the bearing surfaces of both rings with their axes inclined to intersect the axis of the bearing.

4. In a bearing the combination of an inner spherical surfaced race ring having its maximum diameter adjacent one side thereof so that the center of the bearing surface is at an angle to the axis of the bearing, an outer race ring having an inner surface curved as a complement to the curvature of the surface of the inner ring and having the center of its bearing surface at an angle to the axis of the bearing, concaved surface rollers mounted between the bearing surfaces of both rings with their axes inclined to intersect the axis of the bearing, and a cage for the rollers.

5. In a self-aligning thrust carrying roller bearing the combination of a spherical surfaced inner ring with its normal bearing surface at an angle with the axis of the bearing, an outer ring having an inner surface arranged as a complementary curve to the surface of the inner ring and having its normal bearing surface at an angle to the axis of the bearing, and rolling elements mounted between the rings and having their surfaces concaved to approximately fit the curvature of both race ring surfaces and having their axes inclined to intersect the axis of the bearing.

6. In a self-aligning thrust carrying roller bearing the combination of a spherical surfaced inner ring with its normal bearing surface at an angle with the axis of the bearing, an outer ring having an inner surface arranged as a complementary curve to the surface of the inner ring and having its normal bearing surface at an angle to the axis of the bearing, rolling elements mounted between the rings and having their surfaces concaved to approximately fit the curvature of both race ring surfaces and having their axes inclined to intersect the axis of the bearing, and a cage for maintaining the rollers in proper position between the race rings.

7. In a self-aligning radial and thrust carrying roller bearing the combination of an inner spherical race ring having its normal bearing surface at an angle to its axis and having a portion of its normal bearing surface approximately parallel to its axis, an outer race ring having a curved inner surface the normal bearing length of which is arranged at an angle to the axis of the bearing though a portion of the normal bearing surface is arranged substantially parallel to the axis, and rollers between the race rings and having their bearing surface curved to approximately contact with the whole normal bearing surface of each race ring and having a portion of their bearing surface in contact with the angled normal bearing surface of the rings and a portion in contact with that portion of the bearing surface of the rings which is substantially parallel with the axis of the bearing whereby said bearing when assembled may be subjected to radial or thrust loads or both.

8. In a self-aligning radial and thrust carrying roller bearing the combination of an inner spherical race ring having its normal bearing surface at an angle to its axis and having a portion of its normal bearing surface approximately parallel to its axis, an outer race ring having a curved inner surface the normal bearing length of which is arranged at an angle to the axis of the bearing tho a portion of the normal bearing surface is arranged substantially parallel to the axis, rollers between the race rings and having their bearing surfaces curved to approximately contact with the whole normal bearing surface of each race ring and having a portion of their bearing surface in contact with the angled normal bearing surface of the rings and a portion in contact with that portion of the bearing surface of the rings which is substantially parallel with the axes of the bearing whereby said bearing when assembled may be subjected to radial or thrust loads or both, and a cage for containing the rollers and maintaining their proper spacing between the rings.

9. A roller bearing comprising an inner race ring, an outer race ring, and a set of concave faced rollers, the inner race ring having a spherical bearing surface and the outer race ring having a bearing surface curved as a complementary curve of the bearing surface of the inner race ring, the minimum diameter of the outer race ring being less than the maximum diameter of the inner race ring plus twice the minimum diameter of the rollers.

10. A roller bearing comprising an inner race ring, an outer race ring, and a set of concave faced rollers, the inner race ring having a spherical bearing surface and the outer race ring having a bearing surface curved as a complementary curve of the bearing surface of the inner race ring, the minimum diameter of the outer race ring being less than the maximum diameter of the inner race ring plus twice the minimum diameter of the rollers, the rollers having substantially equal diameters at both ends.

11. In a roller bearing the combination of a set of concave faced rollers set at an angle to the axis of the bearing, a spherical surfaced inner race ring, and an outer race ring having a complementarily curved surface.

12. In a roller bearing the combination of a set of concave faced rollers of substantially equal diameters at their ends and set at an angle to the axis of the bearing, a spherical surfaced inner race ring, and an outer race ring having a surface curved as a complement to the surface of the inner race ring.

13. A combined thrust and journal bearing comprising an inner race member of progressively increasing diameter, the outer surface of such member having a transversely curved race, an annular outer race member having an opening therein of progressively increasing diameter, the inner surface of said outer race member having two separate races respectively engaging the sets of rollers.

14. A combined thrust and journal bearing comprising an inner race member of progressively increasing diameter, the outer surface of such member having a transversely curved race, an annular outer race member having an opening therein of progressively increasing diameter, the inner surface of said outer member also having a transversely curved race, and transversely curved rollers between said races, the race on one of said members being substantially of spherical curvature.

JULIUS E. SHAFER.

mal bearing surface at an angle to its axis and having a portion of its normal bearing surface approximately parallel to its axis, an outer race ring having a curved inner surface the normal bearing length of which is arranged at an angle to the axis of the bearing tho a portion of the normal bearing surface is arranged substantially parallel to the axis, rollers between the race rings and having their bearing surfaces curved to approximately contact with the whole normal bearing surface of each race ring and having a portion of their bearing surface in contact with the angled normal bearing surface of the rings and a portion in contact with that portion of the bearing surface of the rings which is substantially parallel with the axes of the bearing whereby said bearing when assembled may be subjected to radial or thrust loads or both, and a cage for containing the rollers and maintaining their proper spacing between the rings.

9. A roller bearing comprising an inner race ring, an outer race ring, and a set of concave faced rollers, the inner race ring having a spherical bearing surface and the outer race ring having a bearing surface curved as a complementary curve of the bearing surface of the inner race ring, the minimum diameter of the outer race ring being less than the maximum diameter of the inner race ring plus twice the minimum diameter of the rollers.

10. A roller bearing comprising an inner race ring, an outer race ring, and a set of concave faced rollers, the inner race ring having a spherical bearing surface and the outer race ring having a bearing surface curved as a complementary curve of the bearing surface of the inner race ring, the minimum diameter of the outer race ring being less than the maximum diameter of the inner race ring plus twice the minimum diameter of the rollers, the rollers having substantially equal diameters at both ends.

11. In a roller bearing the combination of a set of concave faced rollers set at an angle to the axis of the bearing, a spherical surfaced inner race ring, and an outer race ring having a complementarily curved surface.

12. In a roller bearing the combination of a set of concave faced rollers of substantially equal diameters at their ends and set at an angle to the axis of the bearing, a spherical surfaced inner race ring, and an outer race ring having a surface curved as a complement to the surface of the inner race ring.

13. A combined thrust and journal bearing comprising an inner race member of progressively increasing diameter, the outer surface of such member having a transversely curved race, an annular outer race member having an opening therein of progressively increasing diameter, the inner surface of said outer race member having two separate races respectively engaging the sets of rollers.

14. A combined thrust and journal bearing comprising an inner race member of progressively increasing diameter, the outer surface of such member having a transversely curved race, an annular outer race member having an opening therein of progressively increasing diameter, the inner surface of said outer member also having a transversely curved race, and transversely curved rollers between said races, the race on one of said members being substantially of spherical curvature.

JULIUS E. SHAFER.

Certificate of Correction.

It is hereby certified that in Letters Patent No. 1,551,334, granted August 25, 1925, upon the application of Julius E. Shafer, of Chicago, Illinois, for an improvement in "Antifriction Bearings," errors appear in the printed specification requiring correction as follows: Page 3, line 69, claim 13, strike out the word "race" and after the word "member" insert the word *also;* same page and claim, strike out present lines 70 and 71 and insert instead *a transversely curved race, and transversely curved rollers between said races;* and that the said Letters Patent should be read with these corrections therein that the same may conform to the record of the case in the Patent Office.

Signed and sealed this 3d day of November, A. D. 1925.

[SEAL.]

KARL FENNING,
*Acting Commissioner of Patents.*

Certificate of Correction.

It is hereby certified that in Letters Patent No. 1,551,334, granted August 25, 1925, upon the application of Julius E. Shafer, of Chicago, Illinois, for an improvement in "Antifriction Bearings," errors appear in the printed specification requiring correction as follows: Page 3, line 69, claim 13, strike out the word "race" and after the word "member" insert the word *also;* same page and claim, strike out present lines 70 and 71 and insert instead *a transversely curved race, and transversely curved rollers between said races;* and that the said Letters Patent should be read with these corrections therein that the same may conform to the record of the case in the Patent Office.

Signed and sealed this 3d day of November, A. D. 1925.

[SEAL.] KARL FENNING,
*Acting Commissioner of Patents.*